United States Patent [19]

Jaccod

[11] Patent Number: 4,668,208
[45] Date of Patent: May 26, 1987

[54] VARIABLE SPEED DRIVE PULLEY WITH ANTI-FRICTION MEMBER

[75] Inventor: Michel Jaccod, Champigny sur Marne, France

[73] Assignee: Valeo, Paris, France

[21] Appl. No.: 724,926

[22] Filed: Apr. 19, 1985

[30] Foreign Application Priority Data

Apr. 19, 1984 [FR] France ............................. 84 06204

[51] Int. Cl.⁴ .............................................. F16H 55/56
[52] U.S. Cl. ...................................................... 474/43
[58] Field of Search ................. 474/13, 43, 44, 45–46, 474/8, 902, 903, 92

[56] References Cited

U.S. PATENT DOCUMENTS

| | | | |
|---|---|---|---|
| 3,010,333 | 11/1961 | Rampe | 474/44 |
| 3,161,071 | 12/1964 | Getz | 74/230 |
| 3,250,553 | 5/1966 | Detwiler | 474/44 X |
| 3,628,389 | 12/1971 | Wiegelmann et al. | 74/230 |
| 4,178,808 | 12/1979 | Bacher | 474/43 X |

FOREIGN PATENT DOCUMENTS 2035743 12/1970 France .
2376347 7/1978 France .
2499194 8/1982 France .

Primary Examiner—James A. Leppink
Assistant Examiner—Thuy M. Bui
Attorney, Agent, or Firm—Charles E. Brown; Charles A. Brown

[57] ABSTRACT

A variable speed drive pulley, especially for automobile vehicles, comprises coaxial first and second pulley flanges which rotate with a hub and are in axial face-to-face relationship to receive a belt between them. At least the first pulley flange is a mobile pulley flange slidably mounted on the hub with radial clearance. It is thus movable along the hub between two extreme configurations, in at least one of which a primary bearing surface on the mobile pulley flange is in axial face-to-face relationship with a secondary bearing surface. An anti-friction member is disposed axially between the primary and secondary bearing surfaces.

19 Claims, 4 Drawing Figures

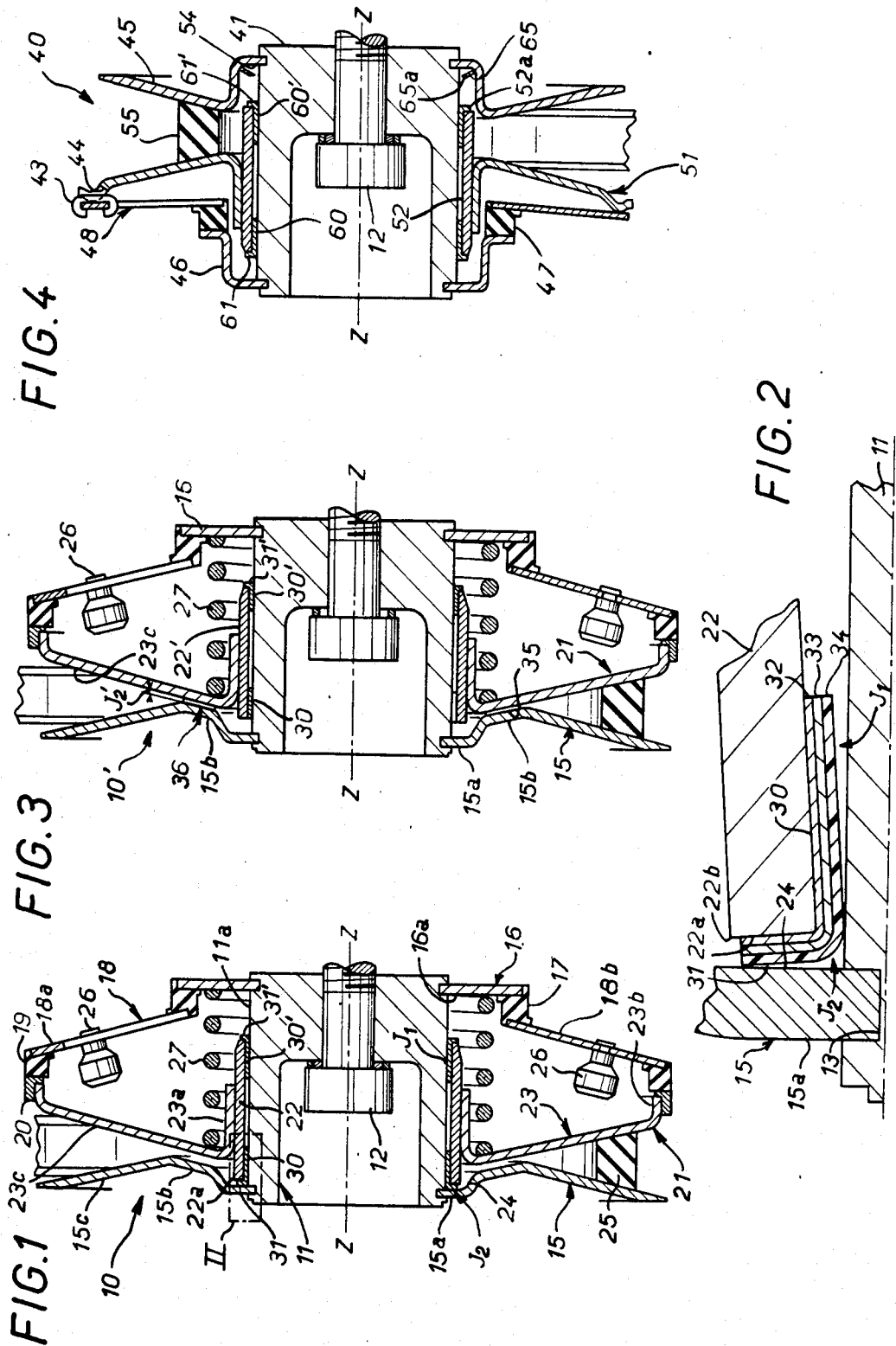

VARIABLE SPEED DRIVE PULLEY WITH ANTI-FRICTION MEMBER

BACKGROUND OF THE INVENTION

1. Field of the Invention

The present invention concerns variable speed drive pulleys, that is to say pulleys comprising two coaxial pulley flanges in face-to-face relationship to receive a belt, constrained to rotate with a hub adapted to turn about a longitudinal axis, the distance between them being variable; at least one of them, referred to hereinafter as the mobile pulley flange, slides along the hub with radial clearance between two extreme configurations in one at least of which a primary bearing surface fast with the mobile pulley flange is brought into face-to-face relationship with a secondary bearing surface fast with the other pulley flange or wit the hub or with both if the other pulley flange is fixed, which corresponds to a frequent situation.

The invention is more particularly concerned with the risks of wear and indentation to which the aforementioned bearing surfaces are subjected in the event of rotational flexing of the mobile pulley flange relative to the hub by virtue of the aforementioned radial clearance between them.

2. Description of the prior art

The general structure of variable speed drive pulleys is well known and is summarized, for example, in U.S. Pat. No. 4,178,808 dated Dec. 18, 1979.

As is known, the mobile pulley flange is generally commanded to slide along the hub by an elastic return and rotational coupling member consisting of a diaphragm spring with variable cone angle comprising a peripheral part forming a Belleville spring in face-to-face relationship with a peripheral axial extension of the mobile pulley flange and a central part divided into radial fingers bearing against a transverse bearing member fast with the hub. More often than not the cone angle of the diaphragm spring is conditioned by the rotation speed of the pulley by means of flyweights mounted cantilever fashion on the diaphragm spring and which, by virtue of the centripetal forces to which they are subjected and which they transmit to the diaphragm spring when the latter is driven in rotation by the hub, exert on the diaphragm spring to the rotational speed of the hub.

In practice, the aforementioned mobile pulley flange oscillates between extreme configurations (generally associated with a null or minimum idling speed and a maximum speed, respectively) generally corresponding to abutment of the mobile pulley flange against the other pulley flange or a bearing surface on the hub. Between these extreme configurations at least the position of the mobile pulley flange is defined by equilibrium between the forces applied to the mobile pulley flange by the diaphragm spring and the belt by virtue of its tension.

As is known, a belt cooperates with the pulley flanges of a pulley by coming into bearing engagement with variable sectors of annular areas of the pulley flanges which because of this are subject to cyclic flexing forces tending to offset them angularly, at least, by elastic deformation: this is generally referred to as rotational flexing. In the present instance of variable speed drive pulleys, this rotational flexing phenomenon is principally reflected in cyclic tilting of the mobile pulley flange relative to the hub by virtue of the radial clearance with which it is mounted on the latter. Thus in its extreme configurations the mobile pulley flange comes into abutment against the other pulley flange or a bearing surface on the hub through variable complementary areas subject to relative movement: there result risks of wear through friction, abrasion and even indentation which may in the long term alter the performance of the pulley. Note that this rotational flexing phenomenon is significantly dependent on the aforementioned radial clearance provided for the mobile pulley flange to slide on the hub.

The present invention is directed towards alleviating these phenomena of indentation and wear by disposing between the bearing surfaces in face-to-face relationship an anti-friction member, an annular flange, for example, preferably attached to the mobile pulley flange.

SUMMARY OF THE INVENTION

The invention consists in a variable speed drive pulley comprising a hub, coaxial first and second pulley flanges constrained to rotate with said hub, disposed in axial face-to-face relationship for receiving a belt between them, at least said first pulley flange being a mobile pulley flange slidably mounted on said hub with radial clearance so as to be movable along said hub between two extreme configurations in at least one of which a primary bearing surface on said mobile pulley flange is in axial face-to-face relationship with a secondary bearing surface, and an anti-friction member dispose axiallly between said primary and secondary bearing surfaces.

An anti-friction member of this kind makes it possible to reduce wear between the bearing sufaces which are in face-to-face relationship in the extreme configurations of the mobile pulley flange. Note that all the benefit of the invention is obtained for the configuration in which the pulley flanges are nearest together.

The anti-friction member is preferably attached to the mobile pulley flange, since the latter is mobile: the anti-friction member may thus be operative via various surfaces without risk of scoring.

The anti-friction member may be mounted on the frustoconical flank of the mobile pulley flange in the vicinity of the hub. It is preferably attached to at least one edge of a bush on which this flank is mounted to be slidable on the hub.

In a preferred embodiment, the anti-friction member in accordance with the invention is a flange fast with one of the anti-firction pads which the aforementioned bush comprised internally at its ends. A flange of this kind has a two-fold function: one is to precisely position the pad axially on its engagement in the bush, and the other is the aforementioned anti-wear function when the pulley is operative.

The flange is advantageously based on polytetrafluorethylene (PTFE) sprayed or otherwise attached to a metal support, coated with bronze balls, for example, force fitted into the bush.

Note that the aforementioned U.S. Pat. No. 4,178,808 proposes a variable speed drive pulley comprising a mobile pulley flange having a bush provided with a cylindrical member of anti-friction material, crimped axially at the ends to said bush, to permit it to slide on the hub. This cylindrical member, which constitutes a single sliding pad, does not have any axial anti-friction function at its crimped ends. It seems that these ends are crimped by means of bevels from which they must not exit by virtue of the abutment function which the bush must fulfil at the time of assembly only.

Other objects and advantages will appear from the following description of examples of the invention, when considered in connection with the accompanying drawing, and the novel features will be particularly pointed out in the appended claims.

BRIEF DESCRIPTION OF THE DRAWING

FIG. 1 is a view in axial cross-section of a first embodiment of variable speed drive pulley, of the driving pulley type.

FIG. 2 is a detail view to a larger scale of the rectangle II in FIG. 1.

FIG. 3 is a view in axial cross-section of an alternative embodiment of variable speed drive pulley in accordance with the invention.

FIG. 4 is a view in axial cross-section of another variable speed drive pulley in accordance with the invention, of the driven pulley type.

DESCRIPTION OF THE PREFERRED EMBODIMENTS

As is known, a variable speed drive is a set of two pulleys comprising pulley flanges the distance between which is variable and which cooperate with a common belt; one of these pulleys, mounted on a drive shaft, is called the driving pulley whereas the other pulley, mounted on a shaft to be driven, is called the driven pulley.

In practice, it is advantageous to use a variable speed drive when auxiliary equipments are to be driven in rotation at a speed which is as constant as possible from a drive shaft which is subject to continuous speed variations; this is the case in particular with the auxiliary equipments of an automobile vehicle (water pump, alternator, compressors, etc) which are driven in rotation from a motor, of the internal combustion type, for example. For this purpose, the ratio of the rotation speeds of the driven and driving pulleys must decrease when the rotation speed of the driving pulley increases. As is known, there is used to this end a driving pulley the pulley flanges of which are adapted to move apart as its rotation speed increases whereas the driven pulley has pulley flanges adapted to move together as its speed increases. It is in this sense that the expressions "driving pulley" and "driven pulley" are used hereinafter, although the opposite characteristics may be preferable in certain specific applications.

The various pulleys shown in FIGS. 1, 3 and 4 are all shown in a minimum idling or null speed configuration. Each comprises one mobile pulley flange.

FIG. 1 shows a pulley 10 of the driving pulley type which comprises, in the known manner, a hub 11 adapted, in the examples shown, to be made fast with a shaft (not shown) by means of a cylindrical head screw 12 in order to drive it in rotation about an axis Z—Z.

In the example shown the hub 11 has an outside surface 11a which is of substantially cylindrical shape. Near its free edges are mounted two stamped sheet-metal members 15 and 16.

As shown, the member 15, forming a fixed pulley flange, comprises in succession, starting from the hub 11, a transverse portion 15a crimped to the hub, a frustoconical portion 15b and then a frustoconical flank 15c, the cone angle of which is identical to that of the portion 15b but in the opposite direction.

The member 16 is a plane annular flange to the radially outermost part of which is attached, as by in situ vulcanization, for example, a flexible elastomer spacer 17. The member 16 comprises a transverse portion 16a extending radially inwards and crimped to the hub.

The spacer 17 is likewise attached, also by in situ vulcanization, to a diaphragm spring 18. The latter comprises in the conventional manner an elastic annular portion 18a forming a Belleville spring extended radially towards the axis by radial fingers 18b separated by slots and having their free ends made fast with the space 17. To the annular portion 18a there is attached, as previously, a spacer 19 also made fast with an annular linking member 20 of angle shape. Flyweights 26 are mounted cantilever fashion on the side of the diaphragm spring facing towards the fixed pulley flange 15.

Between the members 15 and 16 there is slidably mounted a flange member 21 comprising, starting from the hub, a bush 22 to which is attached, as by force fitting and/or welding, for example, a stamped sheet-metal member 23 comprising a frustoconical flank 23c, preferably with the same cone angle as the frustoconical portion 15b of the mobile pulley flange, and extended axially at its radially innermost and outermost edges by respective axial projections 23a and 23b. It is through the intermediary of the inside projection 23a that the member 23 is attached to the bush 22, and the outside axial projection 23b is attached, as by brazing, for examples, to the annular angle member 20.

In the example shown the mobile pulley flange is rotationally keyed and axially actuated by the diaphragm spring 18, its bush serving only as a guide for its sliding motion along the hub 11.

The frustoconical flanks 15c and 23c conjointly cooperate with a belt 25.

To facilitate its sliding motion on the hub, the bush 22 is provided internally with anti-friction pads 30 and 30' disposed near the axial ends of said bush. It has been found that there is no utility in having the pads extend over the entire length of the bush. These pads 30 and 30' cooperate with the hub 11 with radial clearance which is not shown in FIG. 1 but indicated by the reference $J_1$ in FIGS. 1 and 2.

The fixed pulley flange 15 and mobile pulley flange 21 are shown in FIG. 1 in the closest together extreme configuration corresponding to the minimal rotation speed (null or idling speed). The mobile pulley flange is retained in this configuration by the diaphragm spring and a spring 27 operating in compression. As shown, the bush 22 comprises an edge 22a forming a primary bearing surface facing towards a surface 24 on the radially intermost transverse portion 15a of the fixed pulley flange 15 forming a secondary bearing surface. These bearing surfaces are annular and there is a circumferentially variable axial clearance $J_2$ between them, indicated but not represented in FIG. 1, by virtue of the rotational flexing phenomenon to which the mobile pulley flange is subjected by the belt. In the configuration of FIG. 1, this clearance is virtually null between the top parts of the bearing surfaces 22a and 24 and maximal between the bottom parts of the latter. For reasons of clarity the phenomenon of rotational flexing by virtue of the radial clearance $J_1$ has been exaggerated in FIG. 2. It will readily be understood that where $J_2$ is minimal, by virtue of the relative movement between the bearing surfaces, a phenomenon of wear or even indentation, highly localized at any particular time, may develop on the bearing surfaces in face-to-face relationship, because of the outside edge 22b of the bush 22, for example.

In accordance with the invention, a member 31 of anti-friction material is disposed axially between the primary bearing surface 22a and the secondary bearing surface 24. Although it is thin, its thickness provides a minimum spacing between the bush 22 and the pulley flange 15.

In the example shown, this member 31 is attached to the mobile pulley flange; more precisely, it consists of a flange 31 attached to the pad 30.

As shown by way of example in FIG. 2, the flange 31 and the pad to which it is attached comprise three layers 32, 33 and 34 respectively formed, starting fom the hub 22, by a metal support forced fitted into the bush, a layer of bronze balls and a layer of polytetrafluorethylene (PTFE).

In an alternative arrangement (not shown), the flange is formed by a layer of PTFE built up on a bronze braid. This subassembly is attached to the bush 22 by bonding with an adhesive, for example. In another alternative arrangement also not shown, the flange and the associated pad are formed by spraying PTFE or another anti-friction material.

To avoid wear of the bearing surfaces of the mobile pulley flange in its other extreme configuration, in which the aforementioned phenomena of wear and indentation may arise between the mobile pulley flange and the transverse bearing member 16, the second pad 30' is preferably likewise provided with a flange 31' projecting axially relative to the bush. As previously indicated, a flange of this kind facilitates the positioning of the pad and may be used with advantage even where there is no risk of wear.

FIG. 3 shows an alternative pulley 10' entirely similar to the pulley 10 of FIG. 1 (equivalent parts being designated by the same references) except that it comprises a bush 22' shorter than the bush 22 and that the mobile pulley flange 21 and fixed pulley flange 15 come into abutment at the radial level of the frustoconical portion 15b of the fixed pulley flange 15 (forming the secondary bearing surface) and a radially intermost area 35 of the frustoconical flank 23c of the mobile pulley flange (forming the primary bearing surface). There is a circumferentially variable axial clearance J'₂ between these bearing surfaces, as previously.

In accordance with the invention, a member 36 of anti-friction material is disposed between the primary and secondary bearing surfaces, and advantageously attached to the mobile pulley flange. As in FIG. 1, the sliding bush 22' is mounted on pads 30 and 30', of which that opposite the fixed pulley flange at least is provided with a flange 31'.

FIG. 4 shows a driven pulley 40 comprising, in an analogous manner to the pulleys 10 and 10', a hub 41 attached to a driven shaft (not shown) by a screw 12, a member 45 forming a fixed pulley flange and a transverse bearing member 46, attached by crimping to the hub, a diaphragm spring 48 attached to the bearing member 46 by a spacer 47 vulcanised in situ and a mobile pulley flange 51 comprising a bush 52 sliding on the hub 41 by means of pads 60 and 60'.

Note that in the example shown the diaphragm spring 48 is not coupled axially to the mobile pulley flange 51, on which it presses at all times, and that it does not comprise any flyweights; in this instance the torque is transmitted by drive members 43 carried by the diaphragm spring and cooperating with notches 44 on the outside perimeter of the mobile pulley flange 51.

At null rotation speed the mobile pulley flange 51 is in the maximum separation extreme configuration. When its rotation speed increases, an edge 52a of the bush 52 of the mobile pulley flange 51 moves towards a transverse portion 54 of the fixed pulley flange. A member 65 forming an elastic abutment member is advantageously disposed between this portion 54 and the edge 52a to prevent the pulley flanges coming too close together at high rotation speeds, with the risk of generating excessive tension in the associated belt 55. In the example shown, the elastic abutment member 65 is a frustoconical annular member forming a Belleville spring.

In the minimum separation configuration, the fixed pulley flange 45 and the mobile pulley flange 51 feature an axial clearance which, but virtue of rotational flexing, varies circumferentially between a null value and a maximum value, between the edge 52a of the bush 52 and the edge 65a of the member 65 facing towards the bush, which is advantageously bevelled. Where this clearance is null, phenomena of wear and indentation may arise, affecting all contact areas.

In accordance with the invention, a flange 61' is disposed between the edge 52a forming the primary bearing surface and the edge 65a of the member 65, forming the secondary bearing surface. As previously, this flange is advantageously attached to the mobile pulley flange 51, being made fast, as in FIG. 1, with the pad 60' nearest the edge 52a. In the example shown, the other pad 60 is likewise provided with a flange 61.

It will be understood that various changes in the details, materials and arrangement of parts which have been herein described and illustrated in order to explain the nature of the invention may be made by those skilled in the art within the principle and scope of the invention as expressed in the appended claims.

For example, the anti-friction member may be carried by the fixed pulley flange or a transverse portion of the hub, or by the elastic abutment member 65 (which is of an elastomer in an alternative embodiment not shown). The geometry and structure of the pulley flanges have been shown by way of example only, and it is possible for one only of them to be frustoconcial, for example.

There is claimed:

1. Variable speed drive pulley comprising a hub, coaxial first and second pulley flanges constrained to rotate with said hub, disposed in axial face-to-face relationship for receiving a belt between them, at least said first pulley flange being a mobile pulley flange slidably mounted on said hub with radial clearance so as to be movable along said hub between two extreme configurations in at least one of which a primary bearing surface on said mobile pulley flange is in axial face-to-face abutting relationship with a secondary bearing surface, and an anti-friction member disposed axially between said primary and secondary bearing surfaces and forming means for reducing wear when said bearing surfaces come into axial abutting relationship in said one extreme configuration.

2. Pulley according to claim 1, wherein said anti-friction member is linked to said primary bearing surface.

3. Pulley according to claim 1, wherein said second pulley flange is fixed and said anti-friction member is attached to said mobile pulley flange.

4. Pulley according to claim 1, wherein said primary and secondary bearing surfaces are formed on frustoconical portions of respective pulley flanges having the same cone angle.

5. Pulley according to claim 1, wherein said mobile pulley flange comprises a bush slidably mounted on said hub and said primary bearing surface is formed on an edge of said bush.

6. Pulley according to claim 5, wherein said bush comprises internally anti-friction pads and said anti-friction member is fast with one of said pads.

7. Pulley according to claim 6, wherein said bush has remote edges and includes internally in the vicinity of said edges two pads each of which is provided with a flange of anti-friction material.

8. Pulley according to claim 5, further comprising an elastic abutment member applied axially against said second pulley flange and wherein said second pulley flange is fixed and said secondary bearing surface is formed on said elastic abutment member.

9. Pulley according to claim 1, wherein said anti-friction member is in the form of a bronze braid attached to said mobile pulley flange covered with polytetrafluorethylene.

10. Pulley according to claim 1, wherein said anti-friction member comprises a metal support attached to said mobile pulley flange covered with a first layer of bronze balls and a second layer of polytetrafluorethylene.

11. Pulley according to claim 1, wherein said anti-friction member is formed by spraying.

12. Pulley according to claim 6, further comprising an elastic abutment member applied axially against said second pulley flange and wherein said second pulley flange is fixed and said secondary bearing surface is formed on said elastic abutment member.

13. Pulley according to claim 6, wherein said anti-friction member is in the form of a bronze braid attached to said mobile pulley flange covered with polytetrafluorethylene.

14. Pulley according to claim 6, wherein said anti-friction member comprises a metal support attached to said mobile pulley flange covered with a first layer of bronze balls and a second layer of polytetrafluorethylene.

15. Pulley according to claim 6, wherein said anti-friction member is formed by spraying.

16. Pulley according to claim 7, further comprising an elastic abutment member applied axially against said second pulley flange and wherein said second pulley flange is fixed and said secondary bearing surface is formed on said elastic abutment member.

17. Pulley according to claim 7, wherein said anti-friction member is in the form of a bronze braid attached to said mobile pulley flange covered with polytetrafluorethylene.

18. Pulley according to claim 7, wherein said anti-friction member comprises a metal support attached to said mobile pulley flange covered with a first layer of bronze balls and a second layer of polytetrafluorethylene.

19. Pulley according to claim 7, wherein said anti-friction member is formed by spraying.

* * * * *